United States Patent [19]

Wygnanski

[11] Patent Number: 5,402,964
[45] Date of Patent: Apr. 4, 1995

[54] INTERFERENCE WITH VORTEX FORMATION AND CONTROL OF FLUID FLOW TO REDUCE NOISE AND CHANGE FLOW STABILITY

[76] Inventor: Israel J. Wygnanski, 2632 E. Calle Sin Ruido, Tucson, Ariz. 85718

[21] Appl. No.: 142,730

[22] Filed: Oct. 25, 1993

[51] Int. Cl.⁶ .................. B63H 11/10; F02K 1/00
[52] U.S. Cl. .................... 244/1 N; 244/200; 244/130; 181/213; 60/271
[58] Field of Search ............ 244/198, 199, 200, 130, 244/1 N, 1 A; 181/213, 215, 220; 239/265.19, 265.13, 265.11; 60/271

[56] References Cited

U.S. PATENT DOCUMENTS

| | | | |
|---|---|---|---|
| 1,909,186 | 5/1933 | Lougheed | 244/200 |
| 2,071,012 | 2/1937 | Adams | 244/200 |
| 2,322,632 | 6/1993 | Harper, Jr. | 244/200 |
| 2,497,924 | 2/1950 | Beach | 244/1 A |
| 3,153,319 | 10/1964 | Young et al. | 181/215 |
| 3,572,464 | 3/1971 | MacDonald | 239/265.13 |
| 4,220,002 | 9/1980 | Colton | 181/213 |

FOREIGN PATENT DOCUMENTS 55279  1/1952  France ..................... 244/198

OTHER PUBLICATIONS

P. R. Gliebe et al, "Jet Noise Suppression", NASA Reference Publication 1258, vol. 2, WRDC Technical Report 90-3052, pp. 207-269 (Aug. 1991).
J. M. Seiner, "Advances in High Speed Jet Aeroacoustics", AIAA, 84-2275, pp. 1-40 (1984).
K. K. Ahuja et al, "Supersonic Jet Noise Reduction by Coaxial Rectangular Nozzles", AIAA, 92-02127, pp. 752-760 (1992).
L. Shaw, "Twin-Jet Screech Suppression", Journal of Aircraft, vol. 27, No. 8, pp. 708-715, 1990.
J. M. Seiner et al, "Dynamic Pressure Loads Associated with Twin Supersonic Plume Resonance", AIAA, vol. 26, No. 3, pp. 1-9 (1988).
T. D. Norum, "Screech Suppression in Supersonic Jets", AIAA, vol. 21, No. 2, pp. 235-240 (Feb. 1983); and.
E. A. Krejsa et al, "Noise Measurements from an Ejector Suppressor Nozzle in the NASA Lewis 9- by 15-- Foot Low Speed Wind Tunnel", AIAA, 90-3983, pp. 2-59 (Oct. 1990).

*Primary Examiner*—Galen L. Barefoot
*Attorney, Agent, or Firm*—Benman Collins & Sawyer

[57] ABSTRACT

Apparatus for the interference and manipulation of vortex formation and control of fluid flow to reduce noise and increase flow stability is provided. A specific embodiment is directed to a flexible jet noise suppressor for aircraft, particularly supersonic transport. The jet noise suppressor comprises at least one flexible filament having a length that is about 3 to 10 nozzle diameters. The filament(s) trail behind the nozzle and may be let out for take-off and climb and reeled in while the aircraft is in flight or on the ground. Surprisingly, the use of a single flexible filament eliminates the well-known "screech noise" at about 3,000 Hz and reduces the screech noise by about 50 dB while further reducing the broad band noise up to 15 dB over the entire sound spectrum.

16 Claims, 6 Drawing Sheets

INTERFERENCE WITH VORTEX FORMATION AND CONTROL OF FLUID FLOW TO REDUCE NOISE AND CHANGE FLOW STABILITY

TECHNICAL FIELD

The present invention relates to interruption of vortex formation and control of flow by passive means, and, more particularly, to a noise suppression means for jet propelled aircraft, specifically, for supersonic transport.

BACKGROUND ART

The noise level of jet engines, particularly during takeoff and climb, is in the range of 100 to 110 decibels (dB), and is often a concern for people living near airports. Recent advances in technology in the so-called "high speed civil transport" (HSCT) jets have developed plans for airplanes that surpass the Concorde in size and speed, carrying on the order of 350 to 400 passengers a distance on the order of 6,000 miles at speeds in the vicinity of Mach 2. However, the viability of such planes is presently severely restricted due, not so much to the noise of flying at Mach 2 (the flight patterns are intended to be over water), but rather the noise generated during takeoff and climb.

The noise is particularly exacerbated for HSCT craft, because the engines propelling them cannot have a large amount of by-pass air as is the practice in the current subsonic aircraft.

Various approaches have been used or proposed to overcome the noise problem. Earlier solutions have proposed so-called "daisy" nozzles or tubular nozzles to break up the jet in an effort to reduce noise. More recently, an "ejector-suppressor" has been proposed, comprising a "shroud-like" device which is acoustically lined to reduce noise during takeoff. However, this approach may add as much as 5,000 pounds per engine to the weight of the airplane and increase its drag in addition. This weight is simply dead weight, and results in a loss of thrust by the engine and an increase in drag of the airframe.

A noise suppressor for jet engines, particularly for use on HSCT craft, is required. Such a noise suppressor should not add significant weight to the craft nor adversely affect thrust during cruise.

DISCLOSURE OF INVENTION

In accordance with the invention, a flexible jet noise suppressor is provided. The jet noise suppressor comprises at least one flexible filament having a length that is at least about 3 nozzle diameters. The filament(s) trail behind the engine and may be let out for take-off and landing and reeled in while the jet is in flight or on the ground. Alternatively, a disposable fiber may be used during takeoff and climb only. Such disposable fiber comprises a material that either ablates or burns off slowly during the initial portion of the flight.

The flexible jet noise suppressor is especially efficacious under "off-design" conditions in which the nozzle geometry, which is otherwise adjustable in supersonic aircraft in order to match the pressure at the exit of the jet to the external pressure, is fixed and optimized for cruise only ("design" conditions), leading to the generation of shocks as the pressure equalization process takes place at conditions other than cruise.

Surprisingly, the use of a single flexible filament eliminates the well-known shock wave generated "screech noise" when the flow emerging from the nozzle is not precisely expanded to the designed Mach number and reduces the broad band noise over the entire sound spectrum. The screech problem is exacerbated in the case of multiple nozzles and non-symmetric nozzles due to non-uniformities in the pressure field, even when the nozzle exit area is adjustable.

In its broadest aspect, the use of one or more filaments interferes with and modifies the vortex formation and provides more control of fluid flow, resulting in lower noise and more stable flow. Such filaments have broad applications in reducing the intensity of sonic booms, reducing acoustic resonance in cavities of airframes, reducing noise of helicopter rotor blades, reducing drag on surfaces, and improving the effectiveness of flame holders, among many others.

BEST MODES FOR CARRYING OUT THE INVENTION

Figure 1:
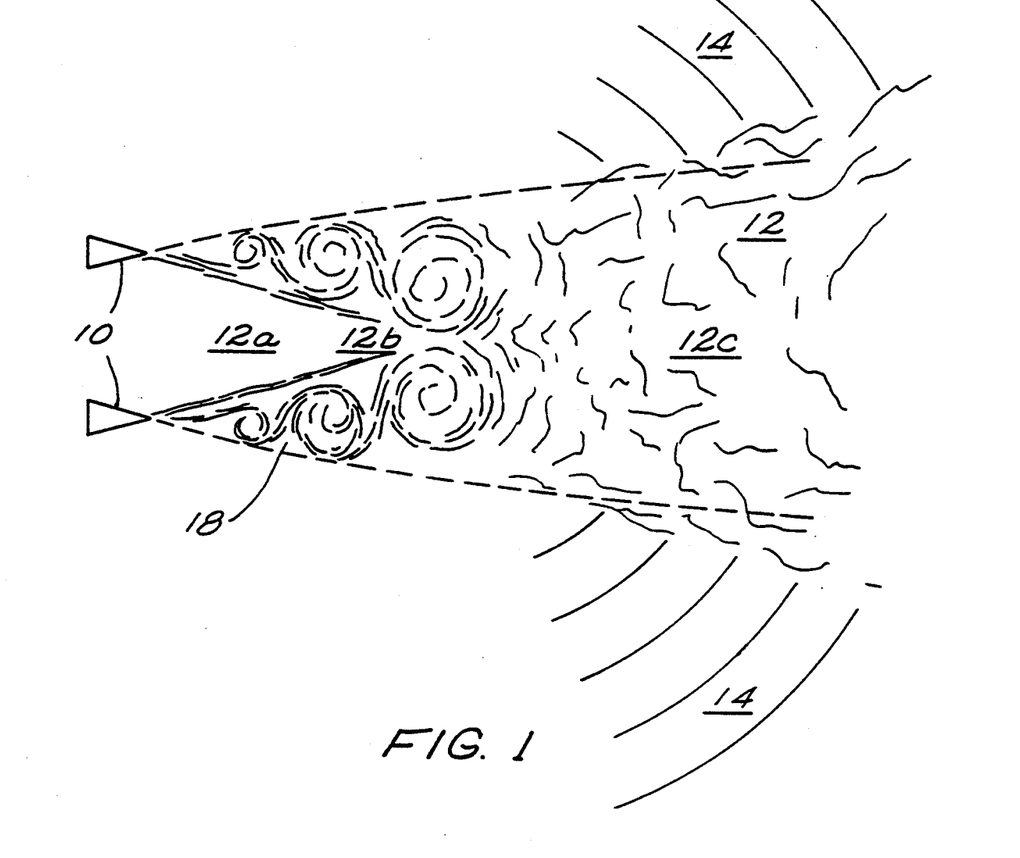
FIG. 1 is a schematic diagram, depicting instability waves and their sound field for an axisymmetric jet.

The noise emitted by a propulsive jet appears to develop initially at about 3 to 4 nozzle diameters downstream from the end of the jet nozzle. FIG. 1 is a schematic diagram depicting the origin of sound, and shows an axisymmetric jet nozzle 10 from which a jet 12 exits. The jet 12 is characterized by three regions: a core region 12a immediately behind the nozzle, a transition region 12b following the core region, and a developed turbulent region 12c following the transition region. Sound waves 14 are seen to develop from the transition region 12b.

Most of the "far field" noise in a jet 12 emanates from a region near the nozzle 10 (up to 6 characteristic nozzle dimensions in a stationary jet which correspond to the region in which the "potential core" or uniform core flow 12a, terminates, that is, the termination of the core region 12a and the beginning of the transition region 12b). Some noise and "screech-noise" in particular is generated by the interaction of the large scale coherent, turbulent structures and the shock structure in the jet as well as the supersonic external flow.

The flow pattern in this portion of the jet also changes. It starts with a mixing layer (shear layer) 18 with its characteristic large eddies and ends with large structures encompassing the entire width of the jet beyond the potential core. Interference with these structures by design may suppress the noise and many such suppressors exist (daisy nozzles, multi-tube nozzles, etc.). All of these devices, however, cause a significant loss of thrust and are in themselves heavy and burdensome.

In accordance with the invention, far field noise is substantially reduced by use of at least one flexible filament, anchored either at the jet lip or at its center. The flexible filament is buffeted by the eddies in the jet and thus absorbs some of their energy.

If the filament is placed in the center of a supersonic jet, then the "no slip condition" at the surface of the filament breaks up the uniformity of the jet velocity, causing a thin layer (boundary layer) of subsonic flow to surround the filament. Mathematically, the flow problem, which is described by parabolic equations in the absence of one or more of the filaments of the invention, will have to be described by elliptical equations in the presence of the filament(s). The physical implication is that the mere presence of the fiber enables the flow to communicate upstream, which it otherwise cannot, and thus create a self-regulating control loop.

Figure 2:
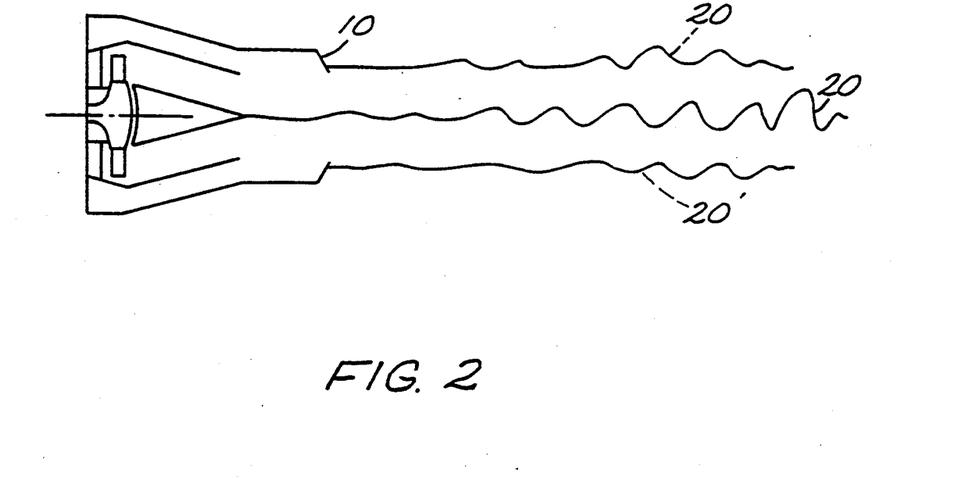
FIG. 2 is a schematic cross-sectional view of the rear portion of a jet engine, indicating possible locations of the flexible filaments of the invention.

The flexibility of the filament can be changed to suit the particular installation; for example, rope or cables may be employed in the practice of the invention. The geometry of the filament may also be varied, depending on the application, and may be circular in cross-section or more ribbon-like. FIG. 2 depicts a jet nozzle 10 to which a single filament 20 or to which a plurality of filaments 20' are attached.

These filaments 20, 20' move laterally by the large coherent structures and impede their growth and their intensity. By impeding the growth of the large coherent structures, the formation of sound is apparently effectively reduced. The flexible filament also interacts with the shocks, effectively diffusing them and thus reducing their strength.

Figure 3A:
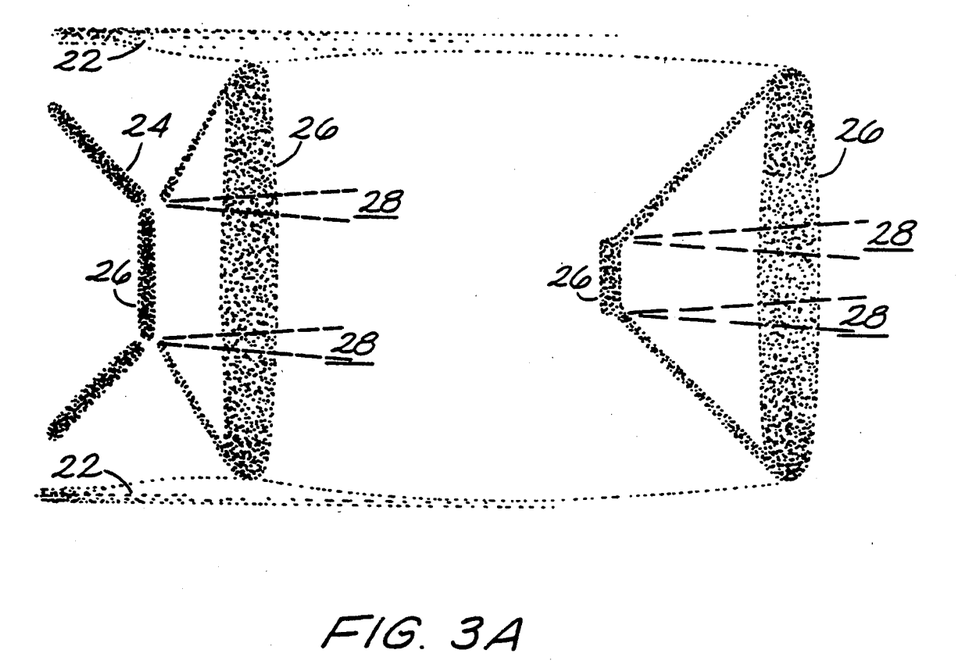
FIGS. 3A and 3B are line drawings of photographs obtained during testing without (FIG. 3A) and with (FIG. 3B) the flexible filament of the invention.
Figure 3B:
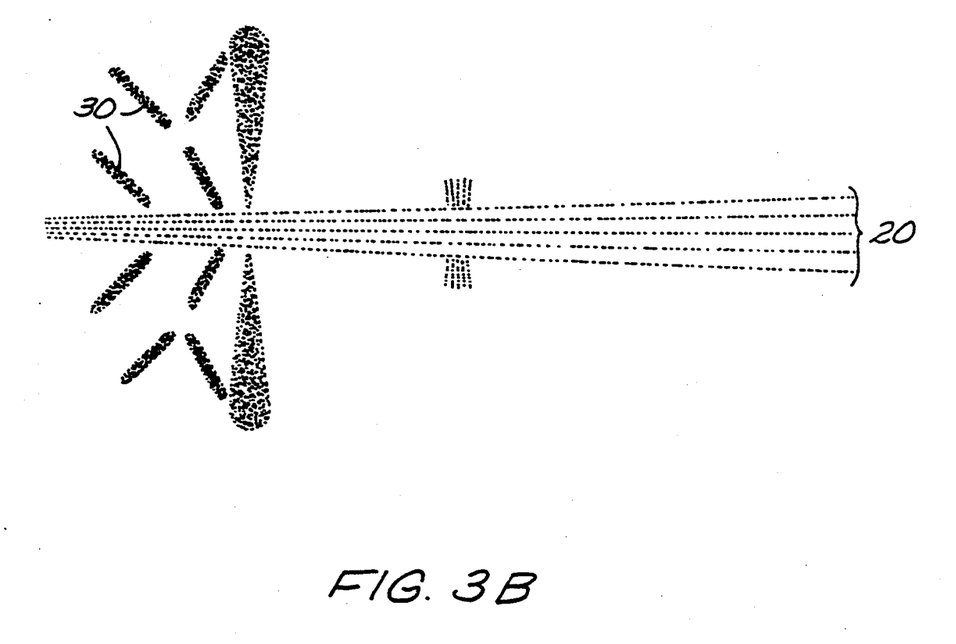

FIGS. 3A–B are line drawings emphasizing the important features of the Shadowgraph pictures obtained during the experiments. The line drawings show the shock wave pattern, the jet borders, some internal shear layers, and the filament. FIG. 3A shows the jet without the filament. The two horizontal lines denoted 22 show the edges of the jet. Several oblique shocks 24 and strong normal shocks 26 are visible in the drawing. The dashed lines show the internal shear layers 28 developed from the intersection of the oblique and normal shocks. Much of the jet noise is produced by the interaction of the shocks with the jet shear layer. FIG. 3B shows the effect of the filament 20 placed at the jet center. The filament 20 shows up in the Shadowgraph as multiple images, due to its motion. The shocks are now diffused, and instead of the strong shocks observed in the free jet case (FIG. 3A), there is a multitude of weak oblique shocks 30 whose interaction with shear layers is significantly reduced.

The flexible filament 20 employed in the practice of the invention may be characterized as a fiber of essentially a circular or square cross-section, of a length as specified below. Alternatively, the flexible filament may be characterized as a ribbon, having a rectangular or elliptical cross-section, of the length specified below. In either case, the cross-section of the filament is small in comparison to the diameter (or other characteristic dimension) of the nozzle.

The fiber or ribbon comprises a material that, as indicated above, is flexible. The material must, of course, also withstand the temperature of the jet, which, in the case of HSCT jets, can reach hundreds of degrees. Examples of suitable materials for such "hot" jets, operating at temperatures in excess of about 100° C., include metal, e.g., steel cable and tungsten, glass, flexible composites, carbon, and asbestos For so-called "cold jets" which are jets operating at lower temperatures below about 100° C. in other applications, other suitable materials may also be employed, including synthetic fibers, such as nylon and dacron.

The location of flexible filament is preferably in the center of the jet, as shown in FIG. 2 with regard to reference numeral 20. Other possibilities include placement on the circumference, placement off-center, or any combination of the foregoing. Placement other than in the center of the jet may necessitate more than one single filament per nozzle.

The length of the flexible filament(s), when placed in the center, is at least 3 nozzle diameters, and preferably is as long as 10 nozzle diameters. However, where two or more fibers or ribbons are present, the filaments may be of the same or different lengths.

The diameter of the flexible filament(s) is typically within the range of about 0.1 to 5% of the nozzle diameter, and may vary along its length.

The flexible filament(s) need only be employed during take-off and initial climb and occasionally for landing in order to reduce jet noise. Accordingly, apparatus may be provided to let out the filament(s) and to reel in the filament(s) as needed. A simple reel mechanism 32, such as depicted in FIGS. 4–6, may be employed in the practice of the invention.

Figure 4:
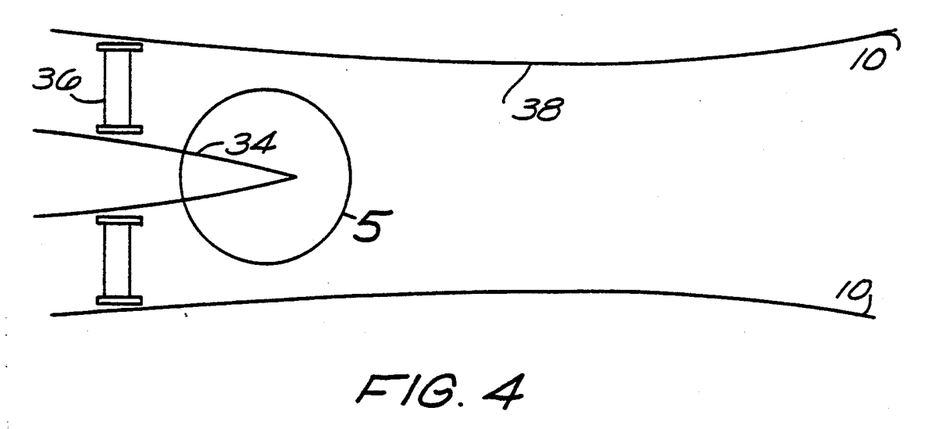
FIG. 4 is a schematic cross-sectional view of the rear portion of a jet engine, showing placement of a take-up reel for releasing and reeling in the flexible filament of the invention.
Figure 5:
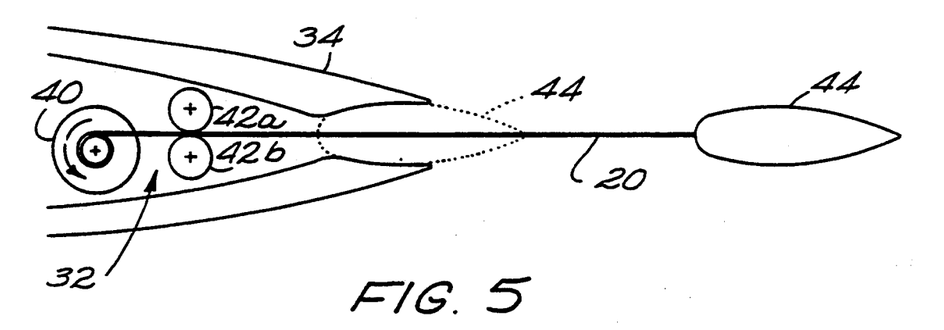
FIG. 5 is an enlargement of a portion of FIG. 4.
Figure 6A:
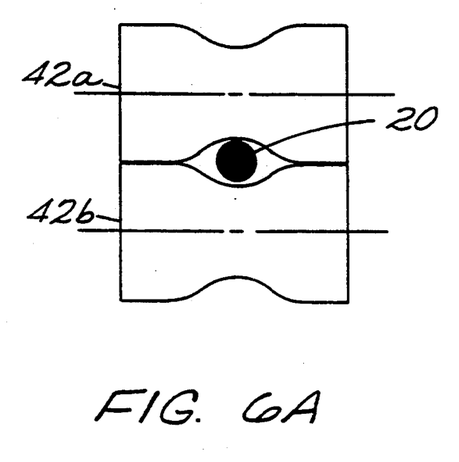
FIG. 6A is front elevational view of idle rollers used in conjunction with the take-up reel of FIGS. 4 and 5.
Figure 6B:
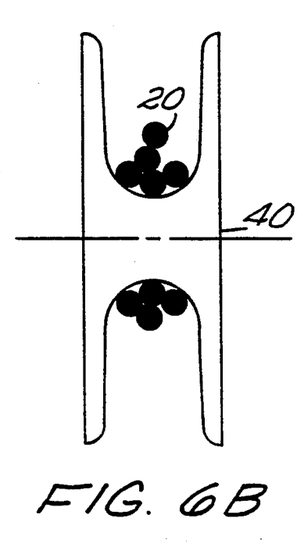
FIG. 6B is a front elevational view of the take-up reels of FIGS. 4 and 5.

As an example and as shown in FIGS. 4 and 5, the filament mechanism 32 may be housed in the engine hub 34 downstream of the last turbine stage 36, which usually terminates in a conical shape. In a supersonic gas turbine engine, the filament mechanism will be located upstream of the throat 38, but in some subsonic jets (e.g., JT9D powering the Boeing 747), it is external to the outer nacelle.

The mechanism 32 consists of a simple powered roller 40 around which the filament 20 is wound. The filament is aligned by passing between two idle rollers 42a, 42b. The roller 40 and idle rollers 42a, 42b are also shown in FIGS. 6A and 6B, respectively.

At the end of the filament, a contoured cone 44 of desirable size is located which locks the filament inside when it is not deployed. The filament will be deployed by allowing the drag force on the cone 44 to unwind it. The cone 44 may be of any convenient shape and may be made of the filament material or any other material desirable. The foregoing description is merely exemplary of one possible filament mechanism. In the case of a disposable (ablating) filament, only an anchor is required.

While the foregoing description has been given in terms of reducing jet noise of an aircraft during take-off and climb, the teachings of the invention appear to have broad use in a variety of applications in which noise is generated by fluid flow and/or vortex formation. Such additional applications and various configurations in which the flexible filament of the present invention can be used are listed below.

A. Vortex Formation

1. Sonic Boom: Sonic boom is one of the main limitations on the flight of supersonic airplanes over inhabited areas. That is why the Concorde is not allowed to fly over land and has to reduce its speed to the subsonic regime far before it reaches the shoreline. The effect of the sonic boom is related to the fact that the strong shocks (whose strength is proportional to the flight speed) cause an abrupt rise in pressure under the entire airplane path.

Reduction of the intensity of a sonic boom by interfering with the coherence of the leading and trailing shocks is achieved by placing a set of fibers or ribbons of the present invention upstream of the shock locations. The interaction between the filaments and the shock disperses the shock, breaking it into smaller, less intense shocklets. The "footprint" of such a shock system is less intense and less focused.

2. Acoustic Resonance: Acoustic resonance in cavities of airframes flying at supersonic speeds is a major engineering problem. The resonance can be excited in wheel bays or in weapons bays. It causes detrimental structural load on the stores inside the cavities and can affect their initial trajectories when released.

The resonance is produced by the vortices in the shear layer separating from the upstream edge of the cavity and impinging on its downstream edge and interacting with the longitudinal and lateral acoustic resonant modes of the cavity. This interaction produces a feedback excitation mechanism between the flow instabilities (vortices) and the acoustic resonant modes.

Ribbons or fibers of the present invention installed at the upstream edge of the cavity interact with the separating shear layer to reduce the coherence of its vortices and thus break the feedback loop. Impingement of the shear layer without coherent structures does not produce acoustic source to excite the cavity modes.

3. Noise Reduction - Helicopters: A major component of the noise results from interaction between the tip vortices shed from the rotor blades which impinge on the leading edges of the blades behind them. The tip vortex impinges on the leading edge of the following blade, causing acoustic resonance which results in structural stress and undesired production of noise. This noise causes early detection of military helicopters.

The flexible fibers or ribbons of the present invention alter the coherence of the tip vortices when they are attached to the blade tip, thus mitigating the noise emission.

4. Flow Separation: Flow separation from blunt bodies and from wings or bodies at high angle of attack affect the aerodynamic forces on them. Flow separation results in a shear layer which develops downstream of the separation point. The growth of this shear layer is dominated by internal vortices which occur intermittently and cause large amplitude fluctuating forces on the bodies. The flexible fibers or ribbons of the present invention not only affect the growth pattern of the shear layer and subsequently the size of the separation region but also reduce the unsteady forces. For blunt bodies, the use of the flexible fibers or ribbons will change the drag and the unwanted oscillatory lift, and for lifting bodies at a high angle of attack, the use of the flexible fibers or ribbons will extend the range of effective incidence at which steady lifting forces are generated. This might be particularly valuable for delta wings.

5. Vortex Shedding: Slender bodies at a high angle of attack shed vortices with an asymmetric pattern. This shedding causes irregular side forces on the body causing stability and controllability problems. The fibers or ribbons of the present invention stabilize the shedding pattern, resulting in a more stable and symmetric wake vortex pattern.

6. Impinging Jets for use in V/STOL Applications: Interaction between the jet vortices and the impingement surface can cause structural, noise, and dust ingestion problems. When the distance between the jet nozzle and the impingement surface corresponds to an integer number of acoustic and convective cycles, a feedback loop is established between the jet vortices and the acoustic mode, producing highly coherent vortices. These vortices cause periodic stress on the structure due to high sound level. The vortices can also cause engine failure by ingestion of dust into the engines.

The fibers or ribbons of the present invention reduce the coherence of these vortices, thus breaking the feedback loop.

7. Reduction of Drag on Surfaces: Large Eddies Break Up (LEBU) devices are used in boundary layers near solid surfaces to reduce drag on bodies. The devices are typically small strips located across the boundary layer near the surfaces. They affect the vortex formation in the boundary layer. A flexible LEBU, or one with attached filaments in accordance with the present invention, improves their performance by enhancing their affect on the turbulence structure inside the shear layer.

8. Automobile Noise: Wake vortices cause noise in cars. The vortices, shed behind various blunt surfaces of a moving vehicle, cause sound emission. Fibers or ribbons of the present invention attached at the point of separation of a moving vehicle reduce the coherence of the wake vortices and thus cut down the noise level.

B. Reacting Flows

1. Flame Holding: Flame stability depends critically on the flow dynamics near the flame holder. The flameholding process is determined by a balance between the flow velocity and the flame speed which in turn depends on the heat transfer rates at the flame holder. The vortical structures in the shear layer governs these processes. Large scale structures reduce the flame stability by causing the flame to move from one vortex to the other, while fine scale turbulence stabilizes the flame.

The fibers or ribbons of the present invention reduce the coherence of the initial vortices, augmenting small-scale turbulence. Thus, enhanced flame stability results from placement of the fibers or ribbons at the flame-holding region of burners and after-burners. Blow-out may be prevented altogether by the addition of the fibers or ribbons of the present invention.

2. Instabilities in Combustors or Chemical Reactors Instabilities in combustors or chemical reactors are caused by interaction between vortices and the acoustic modes of the combustion chamber. When the combustion process is coupled with the vortical flow structures, periodic heat releases occur. Periodic heat release results in pressure pulsations which, when coupled with the chamber acoustic resonant modes, close a feedback-loop, which further enhances the instability. A reduction of the coherence of the vortices eliminates the source of the instability.

Use of the fibers or ribbons of the present invention in the inlet to the reactor to destructively interact with the vortices reduces their coherence and mitigates the instability. The resulting enhanced turbulence is beneficial to achieve steadier energy release.

In each of the foregoing embodiments, the length of the filament of the present invention is that sufficient to reduce noise and/or change flow stability. Based on the teachings herein, the determination of the length (and diameter) is easily made by the person skilled in this art. Typically, the length of the filament is related to nozzle diameter, body diameter, body thickness, vortex diameter, etc., as the case may be, and is within the range of about 3 to 10 times that dimension. Similarly, the thickness of the filament is about 0.1 to 5% of that dimension.

EXAMPLE

A flexible fiber (e.g., nylon rope) whose diameter was only a small fraction of the nozzle diameter and whose length was equal to 10 jet diameters was suspended from the center of the nozzle in a supersonic jet at Mach number of 1.45. Specifically, the diameter of the fiber was about 1 to 5% of the nozzle diameter. For the purposes of the test, the fiber was suspended from crossed wires of tungsten of diameter 0.010 inch in order to place the fiber in the approximate center of the jet 12. The jet was of the type commonly known as a "cold jet" and had a temperature of approximately ambient conditions.

Figure 7:
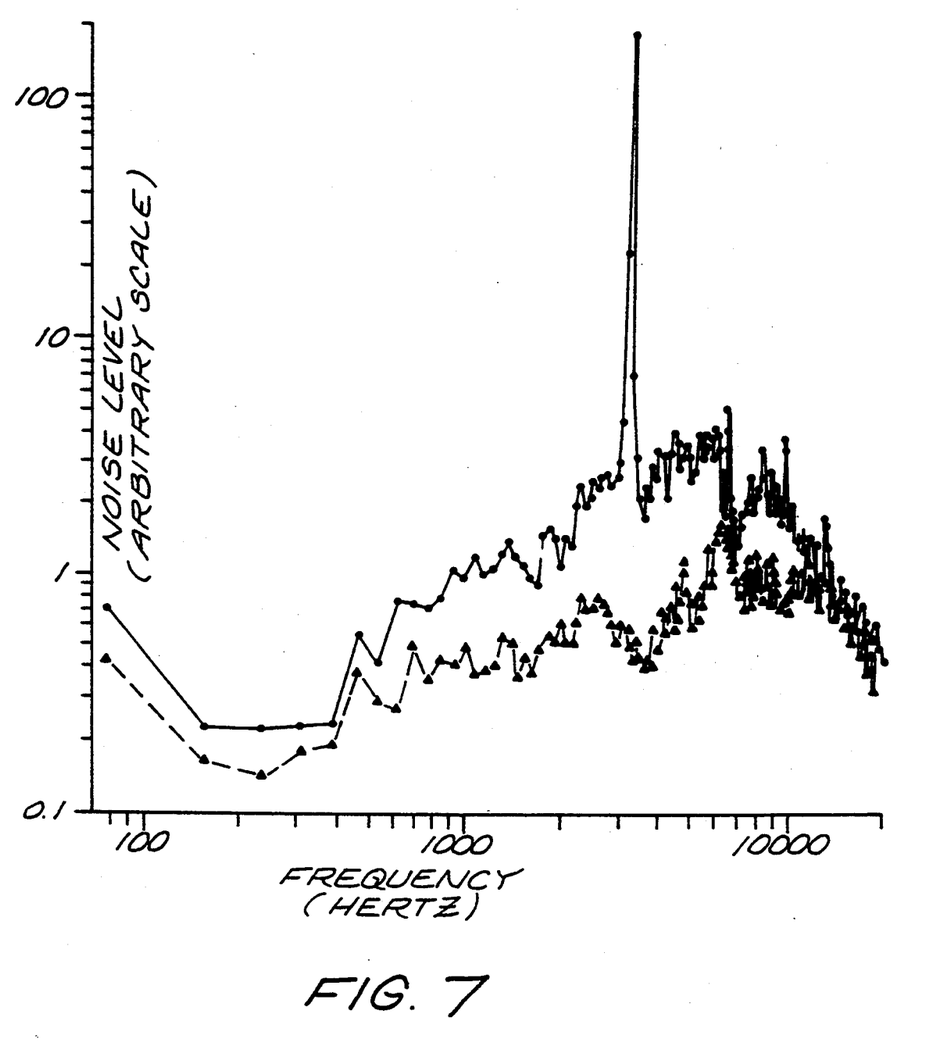
FIG. 7, on coordinates of noise level (having an arbitrary scale in volts) and frequency (in Hertz), is a plot of the jet noise as a function of frequency without the benefit of the invention and with the flexible filament of the invention, as measured by an upstream microphone (microphone 1) located at 135° to the jet axis of the jet.
Figure 8:
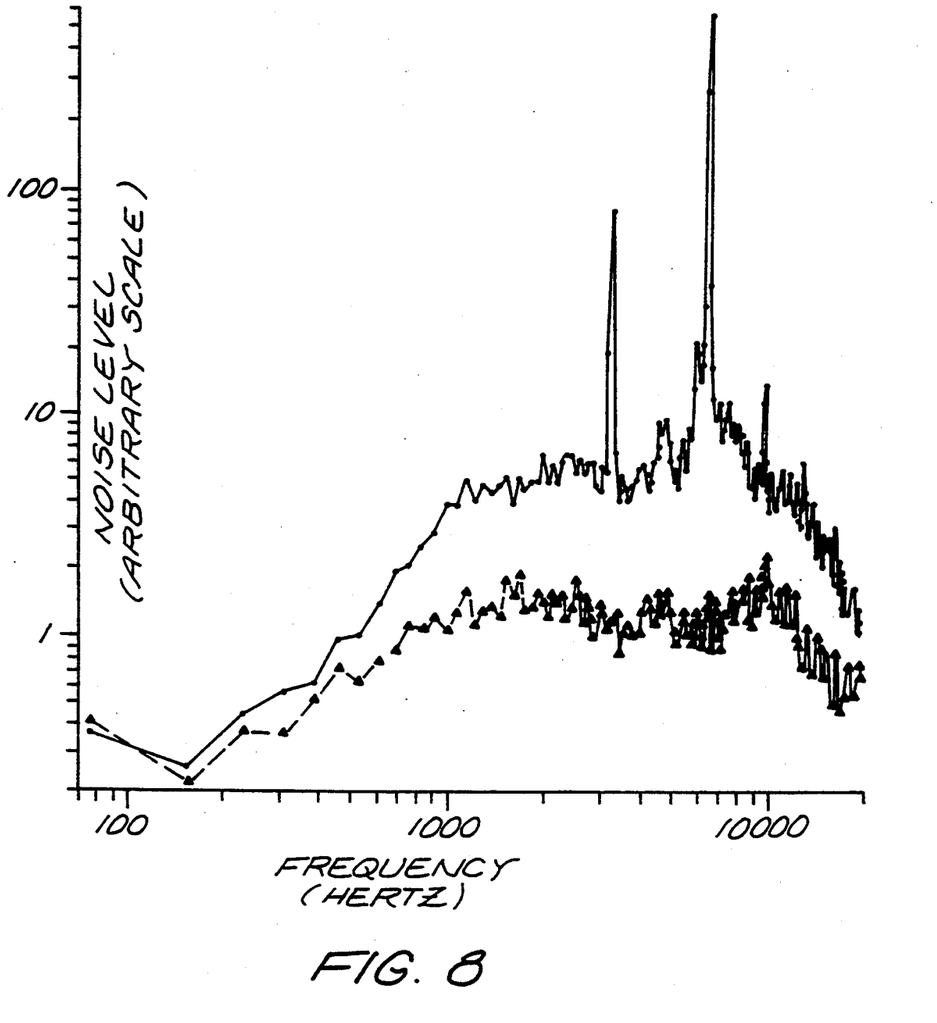
FIG. 8 is a plot similar to that of FIG. 7, but as measured at 90° to the jet axis at the nozzle (microphone 2)
Figure 9:
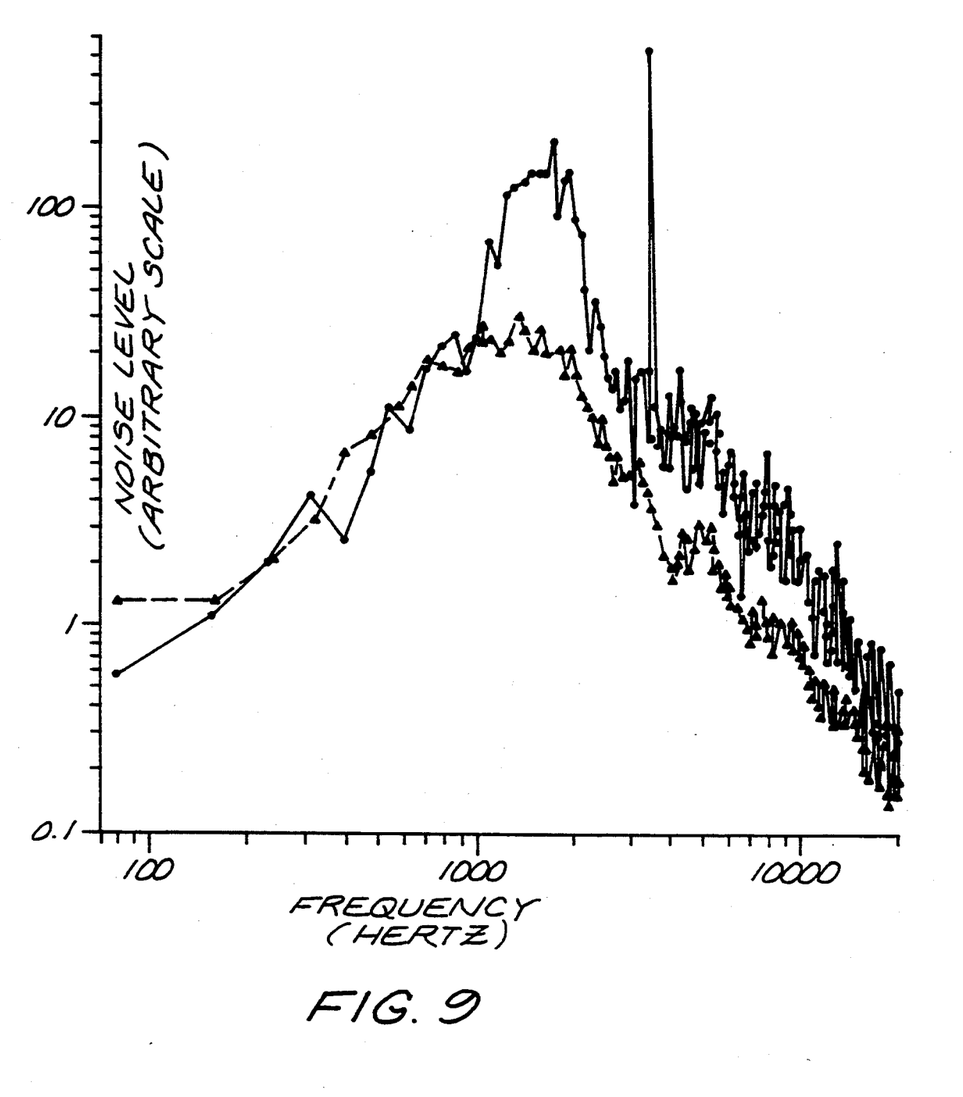
FIG. 9 is a plot similar to that of FIG. 7, but as measured far downstream from the jet (microphone 3) nozzle on a line inclined at 30° to the jet axis.

The far field noise level was measured with microphones in an anechoic chamber located at three angular directions relative to the jet axis. These angles which originated from the center of the nozzle were 30° (downstream), 90° and 135° . (upstream). The microphones were positioned approximately 80 to 100 diameters away from the nozzle. The power spectra of the noise measured without and with the flexible suppressor are shown in FIGS. 7-9, corresponding to each of the three microphones, respectively. Each Figure depicts the sound received by that microphone without use of the flexible filament of the invention (the upper curve in each case) and with use of the flexible filament of the invention (the lower curve in each case).

Typical screech noise reductions for the microphone located at 90° to the axis were 50 dB; for the microphone located at 30° 30 dB; and for the microphone located at 135°, 40 dB The screech tone marked by the sharp peak in the unsuppressed spectra was essentially eliminated by the device of the invention. Broad band noise (at all frequencies concerned) was reduced by up to 15 dB.

Similar tests were run in which the length of the filament was 6 nozzle diameters. Again, the screech tone was essentially eliminated. The reduction in noise, while significant, was lower than the case in which the length of the filament was 10 nozzle diameters.

INDUSTRIAL APPLICABILITY

Flexible filaments for reducing noise are expected to be utilized in supersonic jet transport, as well as subsonic jet transport. In addition, the flexible filament is expected to find broad use in interrupting vortex formation and controlling flow of fluid from surfaces to reduce noise and improve flow stability.

Thus, there has been disclosed a flexible jet noise suppressor for suppressing noise emanating downstream from a jet nozzle and for interrupting vortex formation and controlling fluid flow. It will be appreciated by those skilled in this art that various changes and modifications of an obvious nature may be made, and all such changes and modifications are considered to fall within the scope of the invention as defined by the appended claims.

What is claimed is:

1. Apparatus for interfering with vortex formation and controlling flow of fluid from nozzles and surfaces, said apparatus consisting of a single filament suspended from said nozzle or surface, said filament having a length sufficient to reduce noise and change flow stability from said nozzle or surface.

2. The apparatus of claim 1 wherein said filament comprises a fiber having a cross-sectional diameter of one value in one direction and the same value in an orthogonal direction, said cross-sectional diameter either constant or varying along said length of said fiber.

3. The apparatus of claim 1 wherein said filament comprises a ribbon having a cross-sectional diameter of one value in one direction and a different value in an orthogonal direction, said cross-sectional diameters either constant or varying along said length of said ribbon.

4. The apparatus of claim 1 wherein said filament has a cross-sectional dimension within the range of about 0.1% to 5% of said nozzle or said surface.

5. The apparatus of claim 1 wherein said fluid has a maximum temperature of about 100° C. and wherein said filament comprises a material selected from the group consisting of nylon and dacron.

6. The apparatus of claim 1 wherein said fluid has a minimum temperature of about 100° C. and wherein said filament comprises a material selected from the group consisting of steel, tungsten, glass, flexible composites, carbon, and asbestos.

7. A flexible jet noise suppressor for suppressing noise emanating downstream from a jet nozzle having a given diameter, said jet noise suppressor consisting of a single filament suspended from said jet nozzle, said filament having a cross-sectional area considerably less than said diameter of said jet nozzle and having a length of about 3 to 10 nozzle diameters.

8. The flexible jet noise suppressor of claim 7 wherein said filament comprises a fiber having a cross-sectional diameter of one value in one direction and the same value in an orthogonal direction, said cross-sectional diameter either constant or varying along said length of said fiber.

9. The flexible jet noise suppressor of claim 7 wherein said filament comprises a ribbon having a cross-sectional diameter of one value in one direction and a different value in an orthogonal direction, said cross-sectional diameter either constant or varying along said length of said ribbon.

10. The flexible jet noise suppressor of claim 7 wherein said filament has a cross-sectional dimension within the range of about 0.1% to 5% of said diameter of said jet nozzle.

11. The flexible jet noise suppressor of claim 7 wherein said jet nozzle has an output fluid stream having a maximum temperature of about 100° C. and wherein said filament comprises a material selected from the group consisting of nylon and dacron.

12. The flexible jet noise suppressor of claim 7 wherein said jet nozzle has an output fluid stream having a minimum temperature of about 100° C. and wherein said filament comprises a material selected from the group consisting of steel, tungsten, glass, flexible composites, carbon, and asbestos.

13. The flexible jet noise suppressor of claim 7 wherein said jet nozzle has a central portion, to which said single filament is attached.

14. The flexible jet noise suppressor of claim 7 wherein said filament is contained in a filament mechanism located in an engine hub downstream of a last turbine stage, one end of said filament attached to said filament mechanism and another end of said filament adapted to be let out downstream from said jet nozzle.

15. The flexible jet noise suppressor of claim 14 wherein said filament mechanism comprises (a) a powered roller around which said filament is wound, (b) means for aligning said filament, and (c) a shaped piece attached to said other end of said filament to (1) aid in securing said filament in said filament mechanism when said filament is not deployed and (2) aid in deploying said filament when required.

16. The flexible jet noise suppressor of claim 14 wherein said filament comprises an ablating material and an anchor is attached to said other end.

* * * * *

UNITED STATES PATENT AND TRADEMARK OFFICE
Certificate

Patent No. 5,402,964                          Patented: April 4, 1995

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Israel J. Wygnanski and Ephraim J. Gutmark.

Signed and Sealed this Sixth Day of April, 1999.

CHARLES T. JORDAN
*Supervisory Patent Examiner*
Art Unit 3641